(12) United States Patent
Shin et al.

(10) Patent No.: US 8,848,584 B2
(45) Date of Patent: Sep. 30, 2014

(54) TIME SYNCHRONIZATION AND ROUTING METHOD IN WIRELESS SENSOR NETWORK, AND APPARATUS FOR ENABLING THE METHOD

(75) Inventors: Chang Sub Shin, Daejeon (KR); Gwang Ja Jin, Daejeon (KR); So Young Hwang, Busan (KR); Yoonmee Doh, Daejeon (KR); Bong Soo Kim, Daejeon (KR); Cheol Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1310 days.

(21) Appl. No.: 12/667,298

(22) PCT Filed: Jul. 11, 2008

(86) PCT No.: PCT/KR2008/004099
§ 371 (c)(1),
(2), (4) Date: Dec. 30, 2009

(87) PCT Pub. No.: WO2009/008681
PCT Pub. Date: Jan. 15, 2009

(65) Prior Publication Data
US 2011/0002251 A1    Jan. 6, 2011

(30) Foreign Application Priority Data

Jul. 12, 2007  (KR) .................. 10-2007-0070123
Jul. 9, 2008   (KR) .................. 10-2008-0066518

(51) Int. Cl.
*G08C 17/00* (2006.01)
*H04J 3/06* (2006.01)
*H04W 56/00* (2009.01)

(52) U.S. Cl.
CPC .............. *H04J 3/0679* (2013.01); *Y02B 60/50* (2013.01); *H04J 3/0667* (2013.01); *H04W 56/002* (2013.01)

USPC ........... 370/311; 370/310; 370/303; 370/304

(58) Field of Classification Search
None
See application file for complete search history.

(56) References Cited

U.S. PATENT DOCUMENTS

| 2005/0058149 | A1* | 3/2005  | Howe .......................... 370/428 |
| 2006/0264177 | A1* | 11/2006 | Heidari-Bateni et al. ...... 455/62 |
| 2006/0269028 | A1  | 11/2006 | Bley et al. |
| 2007/0036163 | A1* | 2/2007  | DiBiasio et al. ........... 370/395.4 |
| 2007/0177574 | A1* | 8/2007  | Park et al. .................... 370/350 |
| 2007/0230377 | A1* | 10/2007 | Nosaka et al. ............... 370/294 |
| 2008/0075121 | A1* | 3/2008  | Fourcand .................... 370/503 |
| 2009/0040984 | A1* | 2/2009  | Rajamani .................... 370/336 |

FOREIGN PATENT DOCUMENTS

KR     10-0695074     3/2007

\* cited by examiner

*Primary Examiner* — Anez Ebrahim
(74) *Attorney, Agent, or Firm* — Staas & Halsey LLP

(57) ABSTRACT

A time synchronization method in a wireless sensor network, a low power routing method using a reservation scheme, and an apparatus for performing the method are provided. The time synchronization method in the wireless sensor network may include: receiving a first synchronization request command packet from a parent node that manages time synchronization for a predetermined synchronization region; receiving, from the parent node, a second synchronization request command packet that has a transmission timestamp value of the first synchronization request command packet; and performing time synchronization for a child node based on a reception time of the first synchronization request command packet, a reception time of the second synchronization request command packet, and the transmission timestamp value of the first synchronization request command packet.

15 Claims, 16 Drawing Sheets

FIG. 7

| Frame header | | | Frame payload | | | |
|---|---|---|---|---|---|---|
| Frame Control | Destination Address | Source Address | Command sub-type | Sequence Number | Synchronization Specification | Timestamp value |
| Size:2bytes | 2 | 2 | 1 | 1 | 3 | 3 |

FIG. 8

| Active Order | Wakeup Order | Sync boundary | Sync Request Frame Order | Sync Interval | Reserved |
|---|---|---|---|---|---|
| Size:2bytes | 4-7 | 8-11 | 12 | 13-20 | 21-23 |

FIG. 9

| Frame header | | | Frame payload | | |
|---|---|---|---|---|---|
| Frame Control | Destination Address | Source Address | Command sub-type | Sequence Number | Sync Child Request |
| Size:2bytes | 2 | 2 | 1 | 1 | 1 |

FIG. 11

| Frame header | | | Frame payload |
|---|---|---|---|
| Frame Control | Destination Address | Source Address | Command sub-type |
| Size:2bytes | 2 | 2 | 1 |

FIG. 12

| Frame header | | | Frame payload | | | | |
|---|---|---|---|---|---|---|---|
| Frame Control | Destination Address | Source Address | Command sub-type | Previous address | Next address | End address | Reservation slot number |
| Size:2bytes | 2 | 2 | 1 | 2 | 2 | 2 | 1 |

FIG. 13

| Frame header | | | Frame payload |
|---|---|---|---|
| Frame Control | Destination Address | Source Address | Command sub-type |
| Size:2bytes | 2 | 2 | 1 |

TIME SYNCHRONIZATION AND ROUTING METHOD IN WIRELESS SENSOR NETWORK, AND APPARATUS FOR ENABLING THE METHOD

CROSS REFERENCE TO RELATED APPLICATIONS

This application is a continuation of and claims the benefit of International Application No. PCT/KR2008/004099, filed Jul. 11, 2008, and claims the benefit of Korean Application No. 10-2007-0070123, filed Jul. 12, 2007, and Korean Application No. 10-2008-0066518, filed Jul. 9, 2008, the disclosures of all of which are incorporated herein by reference.

TECHNICAL FIELD

The present invention relates to a time synchronization method and a low-power routing method in a wireless sensor network, and more particularly, to a time synchronization method for performing synchronization for each predetermined region and a low power routing method using a reservation scheme, and an apparatus for performing the method.

This work was supported by the IT R&D program of MIC/IITA. [2006-S-038-03, Development of UHF RF-ID and Ubiquitous Networking Technology]

BACKGROUND ART

A wireless sensor network, for example, a wireless sensor network based on mesh topology, requires low power routing technology.

The lower power routing technology denotes technology that can be applicable to various types of application services such as monitoring of buildings and bridges, environment surveillance, harvest management, physical distribution processing, and the like.

The wireless sensor network for providing the application services generally uses an ad hoc network based on mesh topology.

Each node constituting the wireless sensor network includes a sensor module, a control module, and a communication module. Each node transmits information collected via the sensor module to a destination node using a multi-hop scheme.

Since each node constituting the wireless sensor network generally uses a battery as power, a routing operation and the like may highly require low power characteristics.

Generally, in the wireless sensor network, the low power routing scheme includes a synchronous duty-cycle scheme and an asynchronous duty-cycle scheme. The synchronous duty-cycle scheme and the asynchronous duty-cycle scheme are configured as a function that is mostly performed in a Media Access Control (MAC) layer.

In the synchronous duty-cycle scheme, each node performs time synchronization for the entire network using a synchronization packet to transmit and receive data in an active period, and is changed to a power saving mode in a sleep period in order to reduce power consumption.

In the asynchronous duty-cycle scheme, each node transmits a wake-up packet to neighboring nodes in order to transmit data. After informing about information associated with data transmission, when a node receiving the wake-up packet is changed to a reception mode, each node transmits data.

In the wireless sensor network, low power routing schemes may have a problem that an end-to-end latency time increases. Also, a collision in the network may deteriorate the entire system performance.

DISCLOSURE OF INVENTION

Technical Goals

An aspect of the present invention provides a time synchronization method in a wireless sensor network, a low power routing scheme using a reservation scheme in the wireless sensor network, and an apparatus for performing the method that can solve the above-described problems.

Another aspect of the present invention also provides a time synchronization method and apparatus in a wireless sensor network that can perform time synchronization for each synchronization region.

Another aspect of the present invention also provides a low power routing method and apparatus using a reservation scheme in a wireless sensor network that can reduce an end-to-end latency time.

Technical Solutions

According to an aspect of the present invention, there is provided a time synchronization method in a wireless sensor network, the method including: receiving a first synchronization request command packet from a parent node that manages time synchronization for a predetermined synchronization region; receiving, from the parent node, a second synchronization request command packet that has a transmission timestamp value of the first synchronization request command packet; and performing time synchronization for a child node based on a reception time of the first synchronization request command packet, a reception time of the second synchronization request command packet, and the transmission timestamp value of the first synchronization request command packet.

In this instance, the method may further include: transmitting a first synchronization request command to a child node of a predetermined synchronization region; transmitting a second synchronization request command that has a transmission timestamp value of the first synchronization request command; and receiving a synchronization reply packet corresponding to the first synchronization request command and the second synchronization request command from the child node of the synchronization region.

Also, the method may further include: transmitting a first synchronization request command to a child node of a predetermined synchronization region; transmitting a second synchronization request command that has a transmission timestamp value of the first synchronization request command; and receiving a synchronization reply packet corresponding to the first synchronization request command and the second synchronization request command from the child node of the synchronization region.

According to another aspect of the present invention, there is provided a low power routing method using a reserved scheme in a wireless sensor network, the method including: performing time synchronization for a network; broadcasting a first reservation request packet for data transfer reservation in a first time duration where all the nodes in the network are activated; receiving a second reservation request packet corresponding to the first reservation request packet; and transmitting data to a node having transmitted the second reservation requests packet in a second tie slot where all the nodes in the network are inactivated.

According to still another aspect of the present invention, there is provided a low power routing method using a reservation scheme in a wireless sensor network, the method including: performing time synchronization for a network; receiving a first reservation request packet for data transfer reservation in a first time duration where all the nodes in the network are activated; transmitting any one of a second reservation request packet and a reservation reply packet by referring to the first reservation request packet; and receiving data from a node having transmitted the first reservation requests packet in a second time slot where all the nodes in the network are inactivated.

According to yet another aspect of the present invention, there is provided an apparatus for performing time synchronization and low power routing in a wireless sensor network, the apparatus including: a synchronization packet generator to generate a synchronization packet for time synchronization of a network in a predetermined synchronization region; a synchronization performing unit to perform time synchronization for the network using the synchronization packet; and a reservation packet generator to generate a reservation packet for reservation transfer of data in the network where the time synchronization is performed.

Advantageous Effects

According to the present invention, it is possible to reduce end-to-end latency and power consumption of each node in a wireless sensor network based on mesh topology.

Also, according to the present invention, it is possible to significantly reduce a collision probability in data transmission and thereby decreasing data retransmission and transmission latency.

Also, according to the present invention, it is possible to provide a low power routing function in a mesh network environment without correction of an Institute of Electrical and Electronics Engineers (IEEE) 802.15.4 physical (PHY)/Media Access Control (MAC) layer.

Therefore, according to the present invention, it is possible to solve the problem that an existing routing standard does not support the low power characteristic in the mesh network topology.

BRIEF DESCRIPTION OF DRAWINGS

FIG. 7 illustrates an example of a frame format of a synchronization request command packet according to an embodiment of the present invention;

FIG. 8 illustrates an example of a frame format of a synchronization specification field according to an embodiment of the present invention;

FIG. 9 illustrates an example of a frame format of a synchronization reply packet according to an embodiment of the present invention;

FIG. 11 illustrates an example of a frame format of a synchronization request packet according to an embodiment of the present invention;

FIG. 12 illustrates an example of a frame format of a reservation request packet for reservation data transfer according to an embodiment of the present invention;

FIG. 13 illustrates an example of a frame format of a reservation reply packet according to an embodiment of the present invention;

BEST MODE FOR CARRYING OUT THE INVENTION

Figure 1:
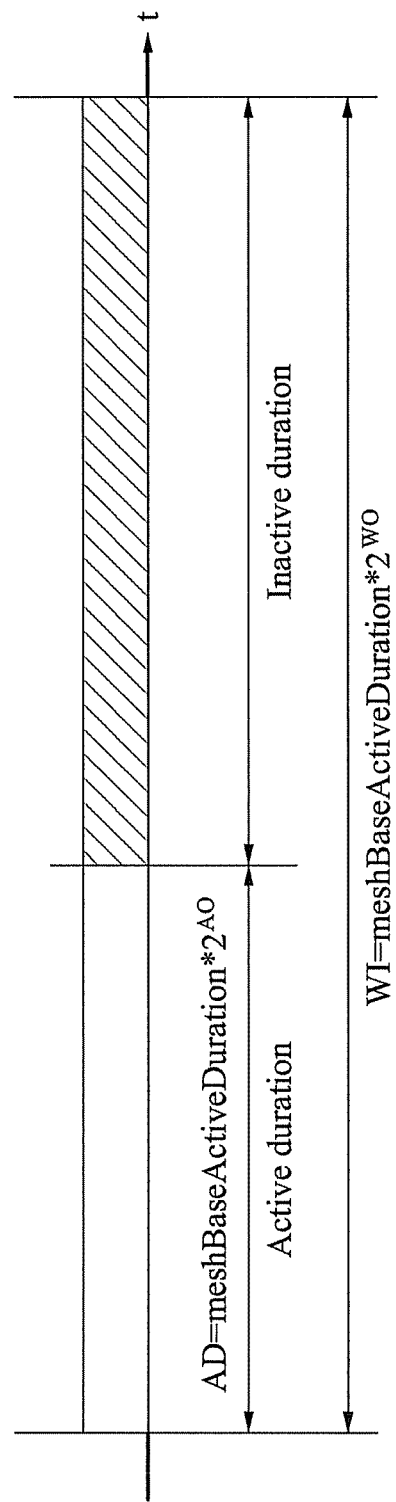
FIG. 1 illustrates a time structure of a wireless sensor network according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

In the following description, "time synchronization" may be briefly used "synchronization". Also, "synchronization" may be interpreted as any one of a "process of matching time information between nodes", "a state where time information between nodes are matched", and "performing a process of matching time information between nodes". Also, in the following description, "data" generally denotes a target of routing in a wireless sensor network.

FIG. 1 illustrates a time structure of a wireless sensor network according to an embodiment of the present invention.

Referring to FIG. 1, the time structure of the wireless sensor network includes a basic format of a "wakeup interval (WI)".

The WI includes an active duration and an inactive duration.

All the nodes included in the wireless sensor network wake up in the active duration, and transmit and receive data in the active duration. Also, all the nodes included in the wireless sensor network enter a sleep mode in the inactive duration, thereby saving energy.

The wireless sensor network uses a synchronous energy saving (SES) function in order to save energy consumption of devices constituting each node.

The SES function is a synchronization scheme for extending a lifetime of the wireless sensor network. The SES function constructs the time structure where all the nodes included in the network perform time synchronization and then have a duty cycle using a predetermined parameter. Thus, it is possible to save energy of devices constituting each node.

Also, the SES function may support two transmission modes, a simple mode and a reservation mode, in the wireless sensor network.

In the simple mode, all the nodes included in the wireless sensor network may transmit data through competition in the active duration. In the reservation model, a transmission node transmitting data may make a reservation for a slot for data transmission in the active duration and transmit the data in the reserved slot of the inactive duration. Since the transmission node transmitting data transmits the data in the reserved slot of the inactive duration, it is possible to minimize end-to-end data transmission latency.

As shown in FIG. 1, when it is assumed that "meshBaseActiveDuration" is a constant value chosen at random, and "active order (AO)" and "wakeup order (WO)" are variables of an index function, the length of the inactive duration (AD) and the length of WI may be defined as follows:

$$AD = \text{meshBaseActiveDuration} \times 2^{AO}$$

$$WI = \text{meshBaseActiveDuration} \times 2^{WO}.$$

Figure 2:
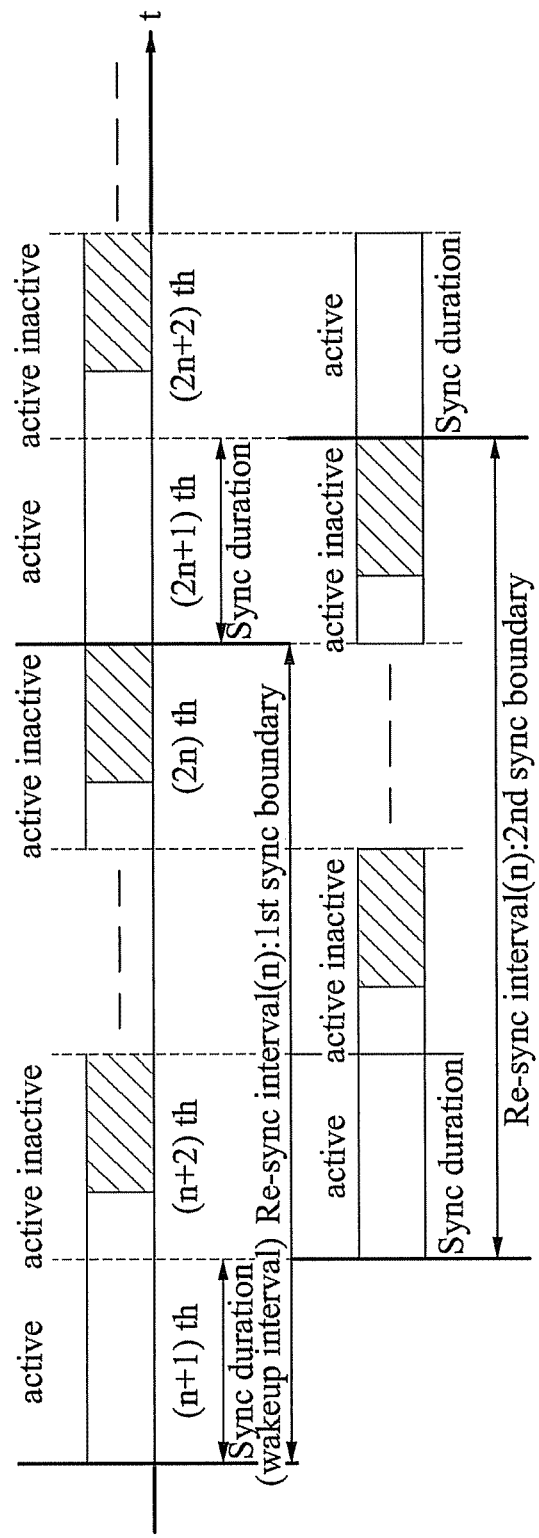
FIG. 2 illustrates a time structure for supporting a synchronous energy saving (SES) function in a wireless sensor network according to an embodiment of the present invention.

FIG. 2 illustrates a time structure for supporting a synchronous energy saving (SES) function in a wireless sensor network according to an embodiment of the present invention.

Referring to FIG. 2, the time structure for supporting the SES function includes a synchronization duration for performing synchronization in $(n+1)^{th}$ WI and $(2n+1)^{th}$ WI. In this instance, time synchronization may be set to be performed only within the synchronization duration.

The synchronization duration may be sequentially set for each synchronization region. Specifically, a synchronization duration of a first synchronization region may be set as $(n+1)^{th}$ WI, $(2n+1)^{th}$ WI, . . . . Also, a synchronization duration of a second synchronization region may be set as $(n+2)^{th}$ WI, $(2n+2)^{th}$ WI, . . .

Also, the time structure for supporting the SES function includes a time duration from $(n+2)^{th}$ WI to $2n^{th}$ WI for performing data transmission in the reservation mode.

Referring to FIG. 2, the sync interval denoting a synchronization cycle includes n×WI.

In FIG. 2, a sync boundary denotes start and end time information of the synchronization cycle for each predetermined synchronization region.

In this instance, "1st sync boundary" denotes a sync boundary of the first synchronization region and "2nd sync boundary" denotes a sync boundary of the second synchronization region.

Therefore, "1st synch boundary" is from $(n+1)^{th}$ WI to $2n^{th}$ WI, and "2nd sync boundary" is from $(n+2)^{th}$ WI to $(2n+1)^{th}$ WI.

Accordingly, the time structure for supporting the SES function is constructed as a sequential time structure where synchronization of the entire wireless sensor network may be performed by performing synchronization for each predetermined synchronization region.

Figure 3:
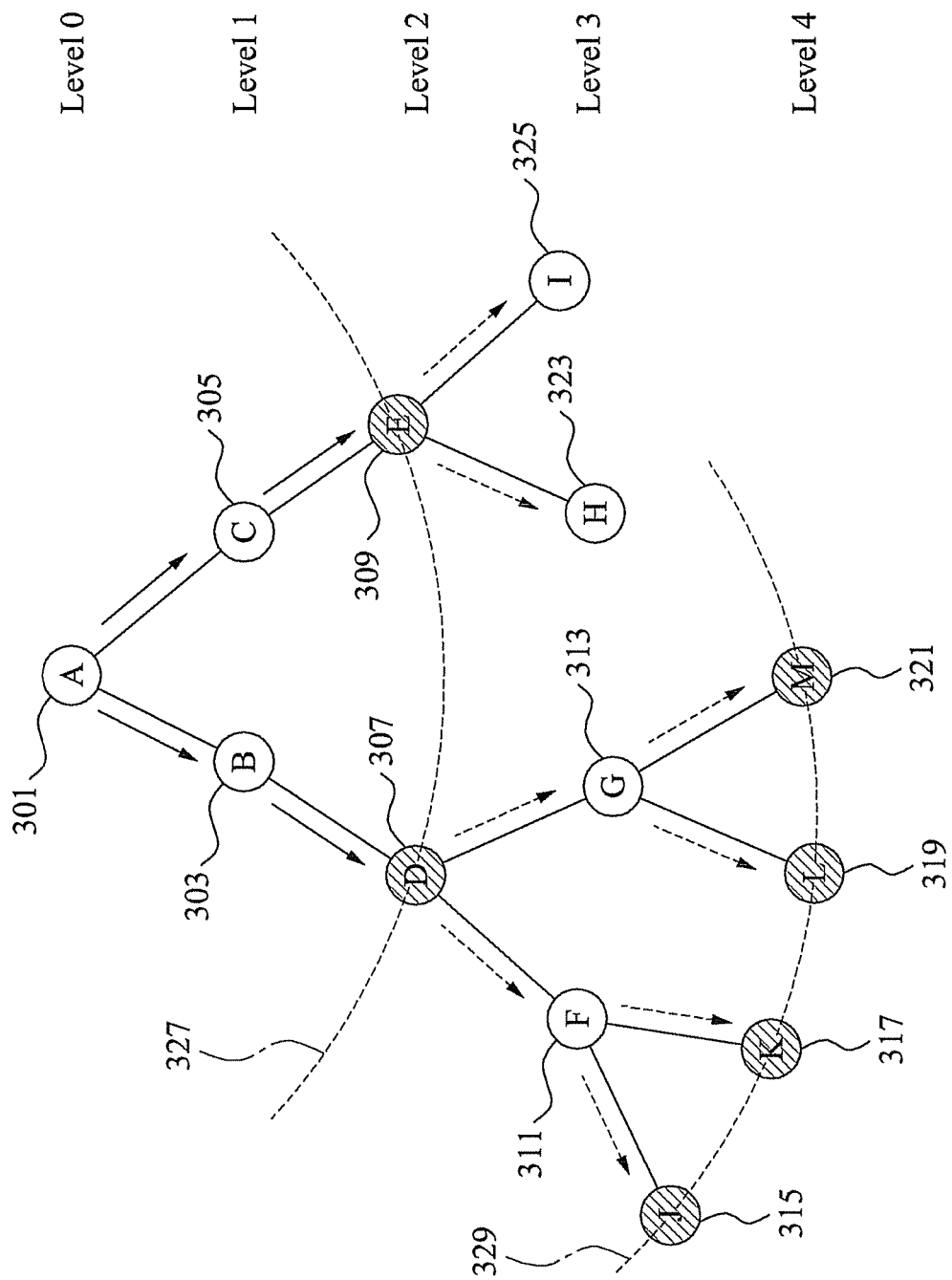
FIG. 3 illustrates an example of a wireless sensor network classified into synchronization regions according to an embodiment of the present invention.

In this instance, the synchronization region denotes a region for performing synchronization and is classified into a region with a predetermined tree level value as shown in FIG. 3.

FIG. 3 illustrates an example of a wireless sensor network classified into synchronization regions according to an embodiment of the present invention.

Referring to FIG. 3, the wireless sensor network includes a first synchronization region 327 and a second synchronization region 329.

The first synchronization region 327 and the second synchronization region 329 correspond to a case where each synchronization region level value is two, Here, the synchronization region level value denotes a tree level value for maintaining synchronization for each region.

Referring to FIG. 3, the first synchronization region 327 includes node A 301 node B 303, node C 305, node D 307, and node E 309.

In the wireless sensor network of FIG. 3, when the node A 301 is assumed as level 0, the node B 303 and the node C 305 belong to a lower level of the node A 301 and thus are level 1. Similarly, it may be assumed that the node D 307 and the node E 309 belong to a lower level of the node B 303 and the node C 305, respectively and thus are level 2. Through this, it can be known that the first synchronization region 327 is a synchronization region with the tree level value of 2.

The node A 301 is a region synchronizer that maintains and manages synchronization for the first synchronization region 327, and starts synchronization. Also, the node A 301 corresponds to a parent node of the node B 303 and the node C 305. The node B 303 and the node C correspond to child nodes of the node A 301.

The relationship between the parent node and the childe is relative. Therefore, in the relationship between the node B 303 and the node D 307, the node B 303 is a parent node of the node D 307 and the node D 307 is a child node of the node B 303.

The second synchronization region 329 includes the node D 307, the node E 309, node F 311, node G 313, node H 323, and node I 325. Also, the second synchronization region 329 further includes node J 315, node K 317, node L 319, and node M 321. Through this, it can be know that the second synchronization region 329 is a synchronization region with a tree level value of 2.

Referring to FIG. 3, the node D 307 and the node E 309 are positioned in a boundary between the first synchronization region 327 and the second synchronization region 329. A node that is positioned in a synchronization region boundary is referred to as a boundary synchronizer.

The boundary synchronizer makes relationship of a region synchronizer with respect to nodes corresponding to a lower level of a corresponding node.

Accordingly, the node D 307 and the node E 309 maintain and manage synchronization for the second synchronization region 329, and start synchronization.

Referring to FIGS. 2 and 3, nodes included in the first synchronization region 327 may perform synchronization in $(n+1)^{th}$ WI corresponding to a first synchronization duration.

Therefore, the node A 301, the node B 303, the node C 305, the node D 307, and the node E 309 perform synchronization in the $(n+1)^{th}$ WI.

Since the time synchronization may be performed for each sync interval, nodes included in the first synchronization region may perform synchronization in $(2n+1)^{th}$ WI.

Also, nodes included in the second synchronization region 329 may perform synchronization in $(n+2)^{th}$ WI corresponding to a second synchronization duration.

Therefore, the node D 307, the node E 309, the node F 311, the node G 313, the node H 323, the node I 325, the node J 315, the node K 317, the node L 319, and the node M 321 perform synchronization in the $(n+2)^{th}$ WI. In this instance, the node D 307 and the node E 309 are a region synchronizer that starts synchronization for the second synchronization region 329.

Figure 4:
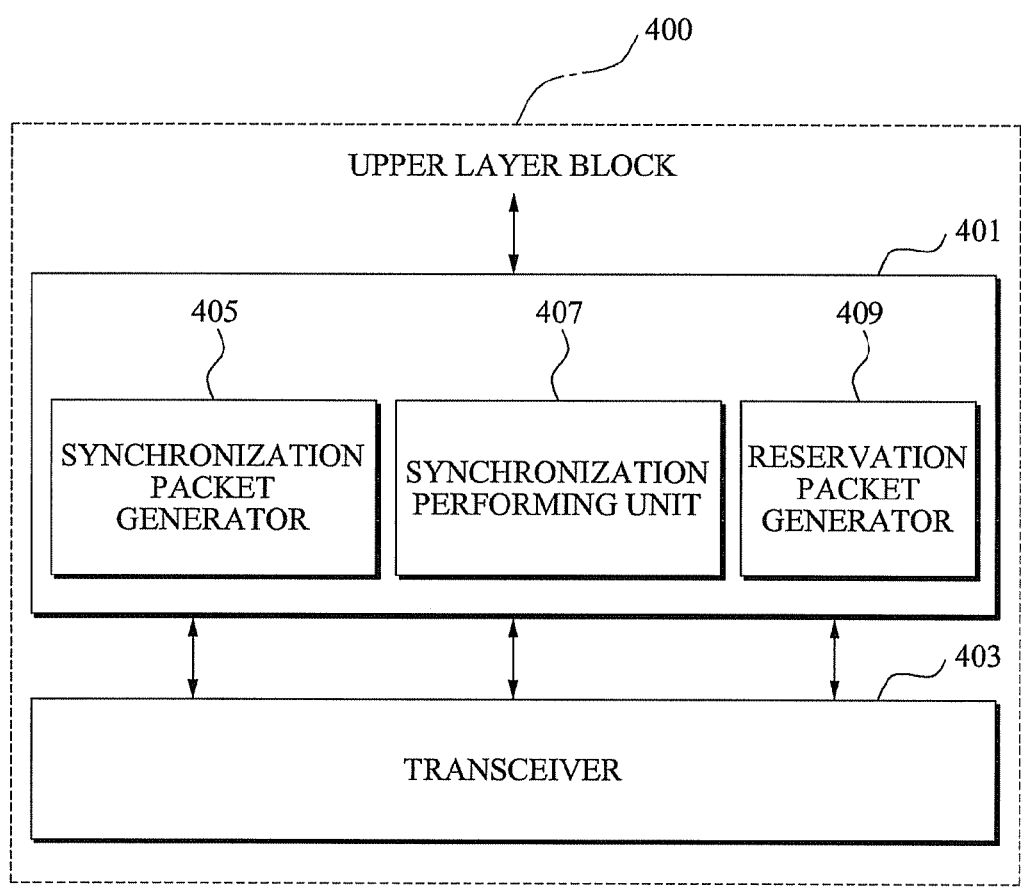
FIG. 4 is a block diagram illustrating an apparatus for performing time synchronization and low power routing in a wireless sensor network according to an embodiment of the present invention.

FIG. 4 is a block diagram illustrating an apparatus 400 for performing time synchronization and low power routing in a wireless sensor network according to an embodiment of the present invention.

The apparatus 400 for performing time synchronization and low power routing denotes a device that constitutes a node in the wireless sensor network. Therefore, depending on embodiments, the apparatus 400 may be a parent node or a child node. Also, the apparatus 400 may be any one of a source node to transmit data, a relay node to relay the data, and a destination node of the data.

Referring to FIG. 4, the apparatus 400 includes a time synchronization and low power routing unit 401 and a transceiver 403.

The time synchronization and low power routing unit 401 may include: a synchronization packet generator 405 to generate a synchronization packet for time synchronization of a network in a predetermined synchronization region; a synchronization performing unit 407 to perform time synchronization for the network using the synchronization packet; and a reservation packet generator 409 to generate a reservation packet for data reservation transfer in the network where the time synchronization is performed.

The synchronization packet generator 405 may generate various types of synchronization packets for synchronization.

The synchronization packet may include any one of a first synchronization request command packet for informing about time synchronization information of the synchronization region, a second synchronization request command packet that has transmission time information of the first synchronization request command packet, a synchronization reply packet corresponding to the second synchronization request command packet, and a synchronization reply packet for error synchronization restoration.

The first synchronization request command packet may include at least one of a sync interval that denotes a synchronization cycle and a sync boundary that denotes start and end time information of the synchronization cycle.

The synchronization performing unit 407 may perform time synchronization for the network using two synchronization packets with different timestamp values. In this instance, the two synchronization packets are the first synchronization request command packet for informing about time synchronization information of the synchronization region and the second synchronization request command packet that has transmission time information of the first synchronization request command packet.

The detailed frame format and function of the first synchronization request command packet, the second synchronization request command packet, and the synchronization reply packet will be described later.

The reservation packet generator 409 may generate a reservation packet for reservation transfer of data.

The reservation packet may include a reservation request packet for informing about a reservation transfer time of the data and a reservation reply packet corresponding to the reservation request packet.

The reservation request packet may include a previous node address, a next node address, an end node address, and reserved slot information for transmitting the data.

The detailed frame format and function of the reservation request packet and the reservation reply packet will be described later.

The transceiver 403 may transmit and receive data, the synchronization packet, and the reservation packet according to a control of an upper layer block (not shown).

The transceiver 403 may broadcast the reservation packet in a first time duration where all the nodes in the network are activated. In this instance, the first time duration where all the nodes of the network are activated may be, for example, an active duration of $(n+2)^{th}$ WI of FIG. 2.

Also, the transceiver 403 may transmit the data in a predetermined slot of the second time duration where all the nodes of the network are inactivated. In this instance, the second time duration where all the nodes of the network are inactivated may be, for example, an inactive duration of $(n+2)^{th}$ WI.

Hereinafter, an operation of the apparatus 400 for performing time synchronization and low power routing will be described in detail with reference to the accompanying drawings.

Figure 5:
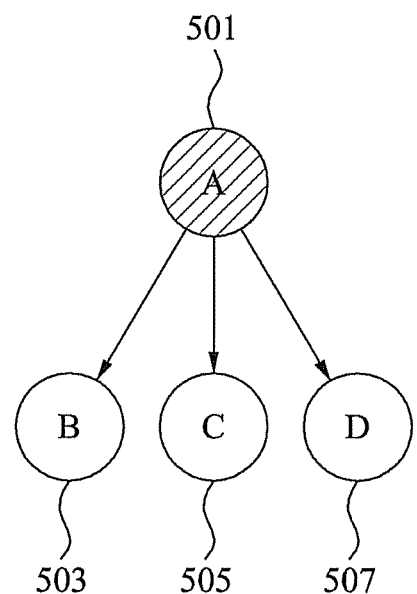
FIG. 5 illustrates an example of nodes performing time synchronization in a wireless sensor network according to an embodiment of the present invention.

FIG. 5 illustrates an example of nodes performing time synchronization in a wireless sensor network according to an embodiment of the present invention.

In FIG. 5, node A 501 is a parent node, and node B 503, node C 505, and node D 507 correspond to child nodes of the node A 501.

According to a principle of performing time synchronization in the wireless sensor network, the child nodes 503, 505, and 507 sequentially receives two synchronization request command packets from the parent node 501, and matches synchronization of the parent node 501 using a difference between a transmission time of first synchronization request command packet and a reception time of second synchronization request command packet.

Accordingly, the child nodes 503, 505, and 507 receive the first synchronization request command packet from the parent node 501 that manages time synchronization for a predetermined synchronization region, receive, from the parent node 501, the second synchronization request command packet that has a transmission timestamp value of the first synchronization request command packet, and perform time synchronization based on the reception time of the first synchronization request command packet, the reception time of the second synchronization request command packet, and the transmission timestamp value of the first synchronization request command packet.

Hereinafter, the time synchronization method according to the principle of performing time synchronization in the wireless sensor network will be described in detail.

Figure 6:
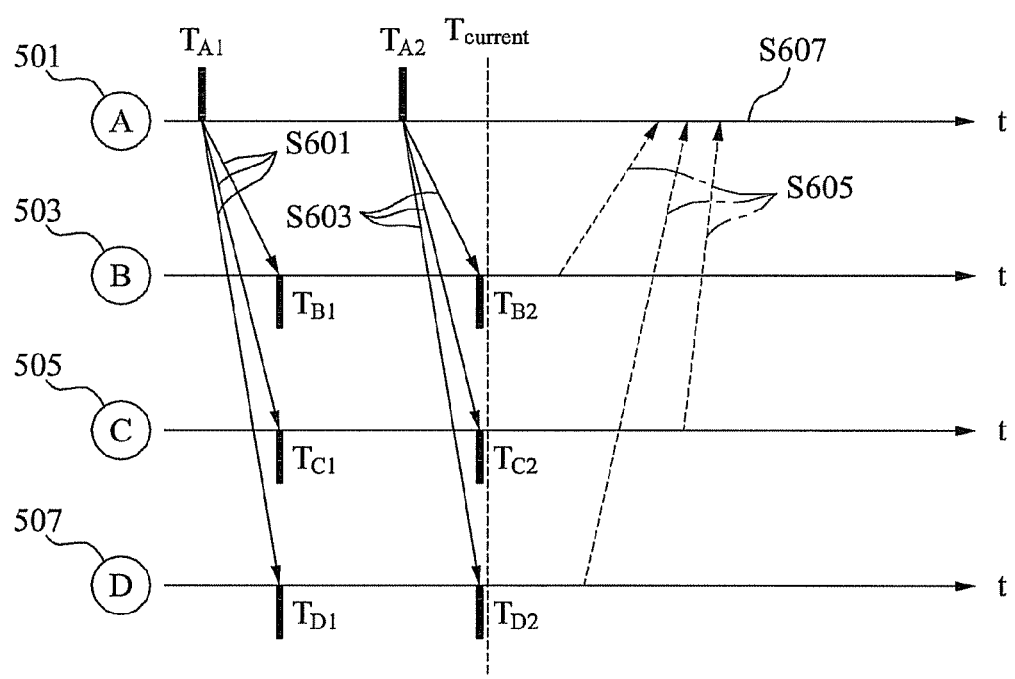
FIG. 6 illustrates an example of a time synchronization process in a wireless sensor network according to an embodiment of the present invention.

FIG. 6 illustrates an example of a time synchronization process in a wireless sensor network according to an embodiment of the present invention.

Referring to FIG. 6, node A 501 is a parent node, and node B 503, node C 505, and node D 507 are child nodes of the node A 501.

When it is assumed that the node A 501 is a mesh coordinator device, the node A 501 may start synchronization by broadcasting a synchronization request command packet to its belonging region in operation S601. In this instance, the mesh coordinator device may be interpreted as the same as a region synchronizer.

A frame format of the synchronization request command packet is shown in FIG. 7. Also, a detailed format of a "synchronization specification" field of the synchronization request command packet is shown in FIG. 8.

In this instance, the synchronization request command packet for starting synchronization may be defined as a first synchronization request command packet.

The node A 501 may set, to zero, all the values of a "timestamp value" field of the first synchronization request command packet and a "sync request frame order" field of FIG. 8.

According to an aspect of the present invention, when it is assumed that the node A 501 has the structure of FIG. 4, a time synchronization and low power routing unit of the node A 501 may receive "MCPS-DATA.request" primitive corresponding to a synchronization start command from an upper layer block and then generate the first synchronization request command packet and broadcast the generated first synchronization request command packet. Next, the node A 501 may transfer, to the upper layer block, "MESH-DATA.confirm" primitive in order to inform about that the first synchronization request command is transmitted. The time synchronization and low power routing unit of the node A 501 may store, as a transmission timestamp value of the first synchronization request command packet, a time when "MESH-DATA.confirm" primitive is transferred to the upper layer block. In this instance, the transmission timestamp value of the first synchronization request command packet may be defined as "meshFirstSendSyncTime".

The node B 503, a node C 505, and a node D 507 store a reception timestamp value of the first synchronization request command.

According to an aspect of the present invention, when it is assumed that the node B 503, the node C 505, and the node D 507 have the structure of FIG. 4, a time synchronization and low power routing unit of each of the node B 503, the node C 505, and the node D 507 may transfer, to the upper layer block, "MCPS-DATA.indication" primitive in order to inform about that the first synchronization request command packet is received.

Also, the time synchronization and low power routing unit of the node B 503, the node C 505, and the node D 507 may store, as a reception time of the first synchronization request command packet, a time when "MCPS-DATA.indication" primitive is transferred to the upper layer block. In this instance, the time when "MCPS-DATA.indication" primitive is transferred to the upper layer block may be defined as "meshFirstReceiveSyncTime".

In operation S603, the node A 501 may broadcast the first synchronization request command packet and then broadcasts a second synchronization request command packet after a predetermined period of time is elapsed. The second synchronization request command packet may have the structure of FIGS. 7 and 8.

In this instance, the node A 501 may set a "timestamp value" field of the second synchronization request command packet to "meshFirstSendSyncTime" and may also set a "sync request frame order" field to 1.

Each of the node B 503, the node C 505, and the node D 507 may store a reception time of the second synchronization request command packet.

According to an aspect of the present invention, when it is assumed that the node B 503, the node C 505, and the node D 507 have the structure of FIG. 4, the time synchronization and low power routing unit of each of the node B 503, the node C 505, and the node D 507 may transfer "MCPS-data.indication" primitive to the upper layer block in order to inform that the second synchronization request command packet is received.

Also, the time synchronization and low power routing unit of each of the node B 503, the node C 505, and the node D 507 may store, as the reception time of the second synchronization request command packet, a time when "MCPS-DATA.indication" primitive is transferred to the upper layer block. In this instance, the time when "MCPS-DATA.indication" primitive is transferred to the upper layer block may be defined as "meshSecondReceiveSyncTime".

The node B 503, the node C 505, and the node D 507 may obtain a difference value between the reception time of the first synchronization request command packet and the reception time of the second synchronization request command packet and add the difference value to the transmission timestamp value of the first synchronization request command packet to thereby match their time information with time information of the node A 501.

According to an aspect of the present invention, it is assumed that the node B 503, the node C 505, and the node D 507 have the structure of FIG. 4. In this instance, a synchronization performing unit of each of the node B 503, the node C 505, and the node D 507 may obtain a difference value between the reception time of the first synchronization request command packet and the reception time of the second synchronization request command packet and add the difference value to the transmission timestamp value of the first synchronization request command packet to thereby match their time information with time information of the node A 501. As described above, the time synchronization is to match time information of the child node with time information of the parent node.

For example, when it is assumed that the reception time of the first synchronization request command packet is $T_{B1}$, the reception time of the second synchronization request command packet is $T_{B2}$, and the transmission timestamp value of the first synchronization request command packet is $T_{A1}$, a synchronization calculation equation may be defined as follows:

$$T_{current}=T_{A1}+(T_{B2}-T_{B1}),\qquad\text{[Equation 1]}$$

where $T_{current}$ denotes time information matching time information of the parent node.

In operation S605, the child node that has performed synchronization using Equation 1 may transmit a synchronization reply packet to the node A 501 corresponding to the parent node.

The frame format of the synchronization reply packet is shown in FIG. 9.

In operation S607, when the synchronization reply packet is received, the node A 501 corresponding to the parent node may store whether to receive the synchronization reply packet.

According to an aspect of the present invention, when it is assumed that the node A 501 has the structure of FIG. 4, the synchronization performing unit of the node A 501 may classify whether to receive the synchronization reply packet for each child node to thereby store the same in a synchronization status field (not shown) of a neighboring list and manage synchronization information of a synchronization region.

When the synchronization reply packet is not received from a particular child node within a predetermined period of time, the node A 501 corresponding to the parent node may retransmit the synchronization request command packet using a unicast scheme.

In addition to the above example, various types of embodiments of the time synchronization process in the wireless sensor network may exist. Hereinafter, other embodiments of the time synchronization process in the wireless sensor network will be described.

In a first embodiment, a child node is synchronized with a time of a parent node through a message exchange between the parent node and the child node.

Specifically, according to the first embodiment, time synchronization of the network may be performed based on two synchronization request messages that are transmitted at different point in times from the parent node and transmission time information of the two synchronization request messages.

The first embodiment may be arranged as follows:

1) Parent node A unicasts a first synchronization request message to particular child node B in time T1.

2) The child node B receives the first synchronization request message in time T2.

3) The child node B transmits a synchronization reply message corresponding to the first synchronization request message to the parent node A in time T3.

4) The parent node A receives the synchronization reply message from the child node B in time T4.

5) When the synchronization reply message is received from the child node B, the parent node A transmits, to the child node B, a second synchronization request message that includes time information associated with T1 and T4.

6) When the second synchronization request message is received, the child node B performs synchronization using a difference value between T1 and T2, and a difference value between T3 and T4.

In a second embodiment, the parent node A broadcasts the first synchronization request message in time TA1.

The second embodiment may be arranged as follows:

1) The parent node A broadcasts a first synchronization request message in time TA1.

2) Child nodes B, C, and D receive the first synchronization request message in time TB2, TC2, and TD2, respectively.

3) The child nodes B, C, and D transmit a synchronization reply message corresponding to the first synchronization request message to the parent node A in time TB3, TC3, and TD3, respectively.

4) The parent node A receives the synchronization reply message from the child node B in time TA4-TB3, receives the synchronization reply message from the child node C in time TA4-TC3, and receives the synchronization reply message from the child node D in time TA4-TD3.

5) When the synchronization reply message is received from each of the child nodes B, C, and D, the parent node A broadcasts a second synchronization request message including time information associated with TA1, TA4-TB3, TA4-TC3, and TA4-TD3.

6) When the second synchronization request message is received, the child nodes B, C, and D perform synchronization based on a difference value between TA1 and TA4-TB3, a difference value between TA1 and TA4-TC3, and a difference value between TA1 and TA4-TD3.

A third embodiment is a synchronization scheme using two synchronization packets as shown in FIG. 4.

A fourth embodiment is a synchronization scheme using a single synchronization packet.

The fourth embodiment may be arranged as follows:

1) The parent node A generates a synchronization packet including timestamp interrupt time information that is used in a Media Access Control (MAC) layer, and broadcasts the generated synchronization packet.

In this instance, the timestamp interrupt time information relates to a time when the synchronization packet is transferred from the MAC layer of the parent node A to a physical (PHY) layer and thus may be regarded as a time when the parent node A broadcasts the synchronization packet.

2) The child node B receives the broadcasted synchronization packet.

3) The child node B performs synchronization to a time of the parent node A based on a reception time of the synchronization packet and the timestamp interrupt time information included in the synchronization packet.

FIG. 7 illustrates an example of a frame format of a synchronization request command packet according to an embodiment of the present invention.

Referring to FIG. 7, the synchronization request command packet includes a frame header and a frame payload.

A "frame control" field includes predetermined frame control information. A "destination address" field includes an address of a reception node of the synchronization request command packet. For example, when a synchronization request command packet is broadcasted, the "destination address" field may be set to "0xffff". A "source address" field includes an address of a transmission node of the synchronization request command packet.

A "command sub-type" field includes information associated with a packet type. Therefore, the "command sub-type" field of the synchronization request command packet includes a value indicating the synchronization request command. A "sequence number" field includes a corresponding sequence number.

A "synchronization specification" field has the frame format of FIG. 8.

A "timestamp value" field includes a timestamp value for performing time synchronization.

FIG. 8 illustrates an example of a frame format of the synchronization specification field.

Referring to FIG. 8, an "active order" field denotes an order of the active duration shown in FIGS. 1 and 2. Here, the order of the active duration denotes which number active duration.

A "wakeup order" field denotes an order of WI, and a "sync boundary" field denotes a start and end time duration of a sync interval.

A "sync request frame order" field denotes an order of the synchronization request command packet and a "sync interval" field denotes a synchronization cycle.

FIG. 9 illustrates an example of a frame structure of a synchronization reply packet according to an embodiment of the present invention.

Referring to FIG. 9, a "sync child request" field stores a value that is used to request for registration of a particular node, having broadcasted a synchronization request command packet, as a child node. The "sync child request" field may be used for synchronization error restoration process to be described later.

In the wireless sensor network, time synchronization is performed for each sync interval. Therefore, the child node may need to receive a synchronization request command frame from the parent node for each sync interval. If the child node does not receive the synchronization request frame from the parent node in a synchronization duration of a particular sync interval, the child node needs to attempt synchronization error restoration.

In the synchronization error restoration attempt, when a first synchronization request command packet or a second synchronization request command packet is not received in a synchronization time duration, the child node may receive a third synchronization request command packet and a fourth synchronization request command packet from another node excluding the parent node and transmit a synchronization reply packet to the node that has transmitted the third synchronization request command packet and the fourth synchronization request command packet.

Figure 10:
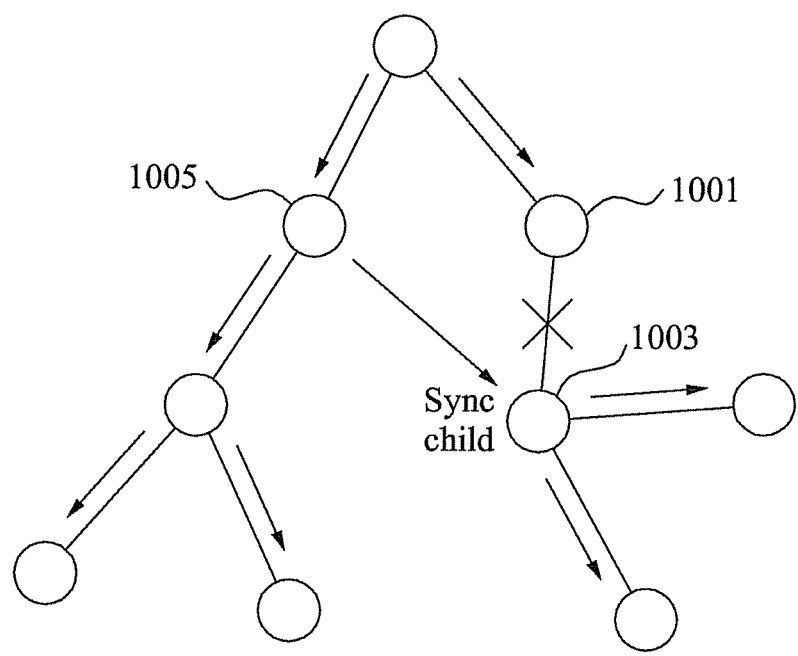
FIG. 10 illustrates an example of a wireless sensor network for describing a synchronization error restoration according to an embodiment of the present invention.

FIG. 10 illustrates an example of a wireless sensor network for describing a synchronization error restoration according to an embodiment of the present invention.

Referring to FIG. 10, a first node 1001 is a parent node of a second node 1003.

When the second node 1003 does not receive a synchronization request command packet from the first node 1001 corresponding to the parent node every sync interval, the second node 1003 may perform synchronization error restoration.

Specifically, when the synchronization request command packet is not received from the first node 1001 within a predetermined period of time of synchronization duration, the second node 1003 corresponding to a child node determines synchronization information may not be received from the first node 1001 any more.

When the second node 1003 receives a synchronization request command packet that is received from a neighboring node 1005 in a next sync interval duration, the second node 1003 may perform synchronization with the neighboring node 1005.

In this instance, the second node 1003 indicates the neighboring node 1005 as a parent node for synchronization and thereby transmits a synchronization reply packet. In this instance, indication of the parent node for synchronization may use a "sync child request" field of the synchronization reply packet.

The second node 1003 and the neighboring node 1005 maintain the relationship for synchronization between the parent node and the child node from the next sync interval.

The time synchronization process of the network for the SES function has been described above.

Hereinafter, the time synchronization process of the network will be described in association with a wireless sensor network based on mesh topology.

In the wireless sensor network based on mesh topology, synchronization for the SES function may be started in such a manner that initialization of a mesh network is formed and then an upper layer of a mesh coordinator calls MESH-START-SYNC.request primitive. A mesh sublayer called for MESH-START-SYNC.request primitive sets a "synchronization specification" field value and a "timestamp" field value of two consecutive synchronization request command packets and transmits the synchronization request command packets to its child nodes.

The child nodes receiving the synchronization request command packets may construct an SES time structure for low power and perform synchronization. The mesh coordinator may receive a synchronization reply packet from the child nodes and manage the synchronization status.

When the mesh coordinator receives the synchronization reply packet from all the nodes, the mesh coordinator may inform the upper layer about the above event using MESH-START-SYNC.confirm primitive.

Otherwise, the mesh coordinator may retransmit the synchronization request command packet to a child node that has not received the synchronization request command packet and thereby perform synchronization again. Child nodes succeeding in synchronization, when having a child node, may perform the above synchronization procedure with respect to their own child node and match the global synchronization of the network.

Time synchronization using the synchronization request command packet may be performed from the mesh coordinator to a tree-based end node.

Also, a process of periodically maintaining the global synchronization of the entire network will follow as:

1) All the nodes included in the network should perform synchronization again every predetermined cycle.

The synchronization cycle value is a sync interval value. The sync interval value is set by the mesh coordinator, is included in a sync request frame, and is informed to all the nodes. The sync interval value may be expressed as n*WI, and may also be set based on a network size and a sync resolution.

2) Topology of the entire network performs synchronization by dividing a region from the mesh coordinator into predetermined levels.

So that all the nodes included in each synchronization region may perform synchronization during WI, the mesh coordinator may set a sync region level value, contain the set value in the synchronization request command packet, and transfer the same. Through this, the synchronization procedure for global synchronization in the large-sized network may be performed within a limited time structure and thus it is possible to improve reliability and scalability.

3) So that all the nodes in the synchronization region may complete synchronization during WI, the entire duration of a wakeup interval may be expanded to an active duration and be used without temporarily using an inactive duration in the sync duration.

In this instance, transmission of general data is prohibited in the sync duration.

When a new device participates in the wireless sensor network having the SES function to thereby construct a node, the following initialization process may be additionally performed.

1) A new node may be assigned with a node address from a upper level node of the new node and then receive a synchronization request command packet and perform synchronization for the received synchronization request command packet.

2) The new node may be assigned with the node address from the upper level node of the new node and then transmit the synchronization command packet in a frame format of FIG. 11 to the upper level node and start synchronization.

When the time synchronization process is completed, data transmission according to the SES function is performed. A scheme for data transmission according to the SES function includes a simple data transmission scheme and a reservation data transmission scheme.

According to the simple data transmission scheme, after performing time synchronization for the network, each node may transmit and receive data in the active duration and enter a sleep mode in the inactive duration in order to save energy.

Here, it is assumed that a data routing route is predetermined according to various types of routing algorithms.

The reservation data transmission scheme is to transmit and receive a reservation request packet for data transmission reservation and thereby complete the reservation in the active duration, and transmit the data in a reserved slot of the inactive duration.

A node that desires to transmit data may transmit the reservation request packet in the active duration. The node that desires to transmit data may set a destination address of the reservation request packet as a broadcast address. Thus, all the neighboring nodes of the node that desires to transmit data may receive the reservation request packet to thereby determine whether to make a reservation reply based on information included in a payload of the reservation request packet, whether to continue the reservation process, or whether to drop the received reservation request packet.

The reservation data transmission scheme transmits only reservation-complete data in the active duration. Reservation of data transmission with respect to unreserved remaining route may be performed again in a next active duration.

Specifically, the reservation data transmission scheme may make a reservation for a slot of the inactive duration based on a hop unit in the active duration, and transmit data in the reserved slot.

FIG. 12 illustrates an example of a frame format of a reservation request packet for reservation data transmission.

In FIG. 12, a "previous address" field includes an address value of a node that has transmitted a reservation request packet in a previous hop. When node A initially broadcasts a reservation request packet, the "previous address" field includes an address value of the node A.

A "next address" field includes an address value of a node to receive the reservation request packet in a current hop. An "end address" field includes an address value of a final destination node, and a "reservation slot number" field includes reserved slot information.

A function of each field value will be described later in detail.

FIG. 13 illustrates an example of a frame format of a reservation reply packet according to an embodiment of the present invention.

The reservation reply packet of FIG. 13 is broadcasted by only the end node. Detailed description related thereto will be described later.

Hereinafter, an embodiment of a low power routing method using a reservation scheme will be described with reference to FIGS. 14, 16 and 17. In the following description, it is assumed that data is transmitted in an order of node A 1601, node B 1603, node C 1605, and node D 1607.

Figure 14:
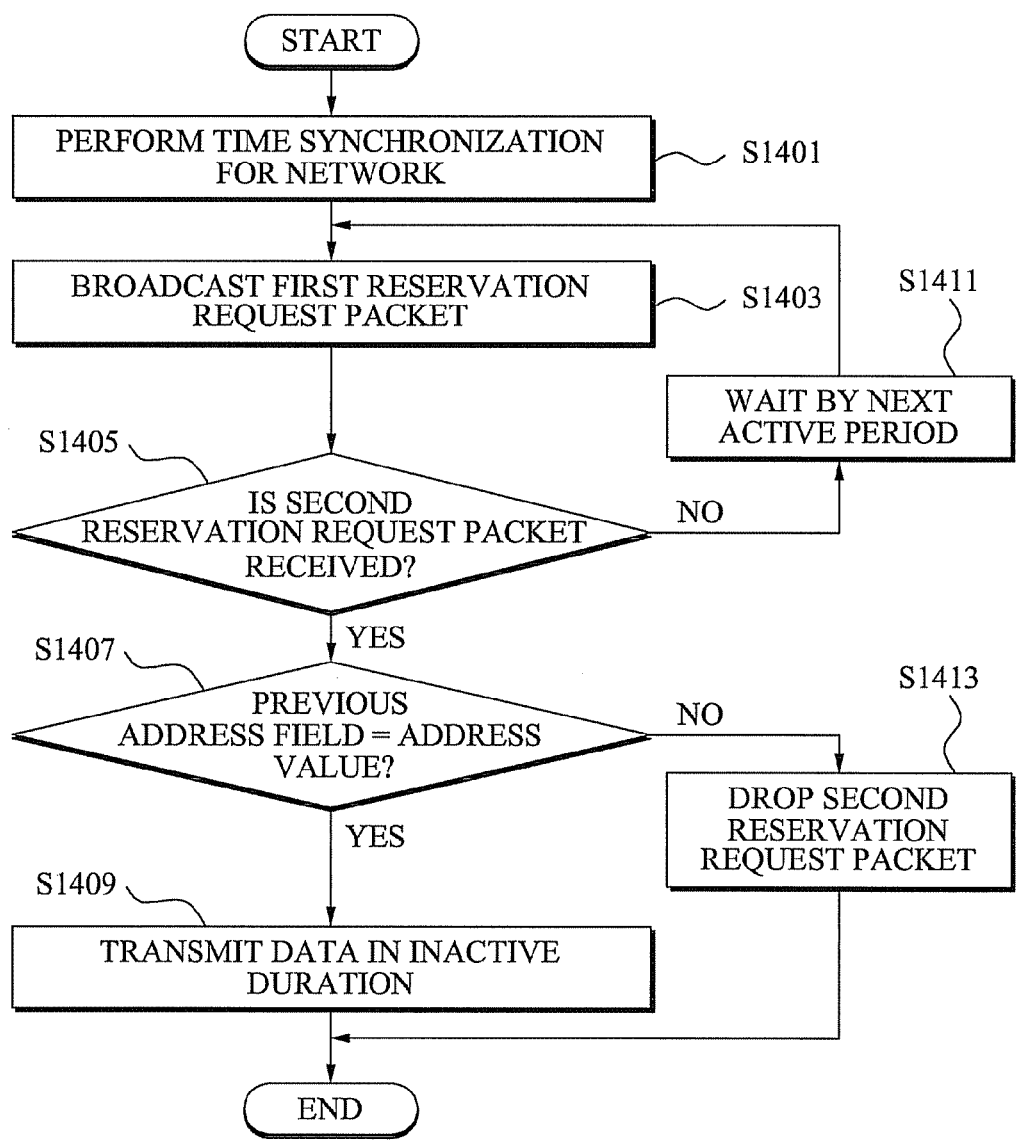
FIG. 14 is a flowchart illustrating a low power routing method using a reservation scheme in a wireless sensor network according to an embodiment of the present invention.

FIG. 14 is a flowchart illustrating a low power routing method using a reservation scheme in a wireless sensor network according to an embodiment of the present invention.

FIG. 14 illustrates operations performed in the node A 1601 that initially transmits data.

Referring to FIG. 14, the lower power routing method using the reservation scheme may include: performing time synchronization for a network in operation S1401; broadcasting a first reservation request packet for data transfer reservation in a first time duration where all the nodes in the network are activated in operation S1403; receiving a second reservation request packet corresponding to the first reservation request packet in operation S1405; and transmitting data to a node having transmitted the second reservation requests packet in a second tie slot where all the nodes in the network are inactivated in operation S1409.

The node A 1601 may perform time synchronization for the network for each synchronization region in operation S1401. In this instance, the time synchronization scheme may adopt all the synchronization schemes.

In operation S1403, the node A 1601 may broadcast the first reservation request packet for data transmission reservation. In this instance, the first reservation request packet is in the frame format of FIG. 12.

Thus, a "previous field" value of the first reservation request packet includes an address value of the node A 1601. Also, a "reservation slot number" field of the first reservation request packet includes slot information for transmitting data in the second time duration.

When the first reservation request packet is received from the node A 1601, the node B 1603 may broadcast the second reservation request packet. Thus, in operation S1405, the node A 1601 may receive the second reservation request packet from the node B 1603. Conversely, when the node B 1603 does not receive the second reservation request packet from the node B 1603 in operation S1405, the second node B 1603 may wait until a next active duration of WI in operation S1411 and then repeat operation S1403.

The second reservation request packet may be in the frame format of FIG. 12. Thus, a "previous field" value of the second reservation packet may include the address value of the node A 1601.

In this instance, the first reservation request packet and the second reservation request packet may be broadcasted in the first time duration where all the nodes included in the network are activated.

The first time duration where all the nodes in the network are activated corresponds to the active duration of FIG. 1. Also, the first time duration where all the nodes in the network are activated corresponds to the active duration from $(n+2)^{th}$ WI to $2n^{th}$ WI of FIG. 2.

When the node A 1601 receives the second reservation request packet from the node B 1603, the node A 1601 may be constructed by further including operation S1407 of determining whether a "previous address" field included in the second reservation request packet" is the same as the address value of the node A 1601.

In operation S1413, when the "previous address" field is different from the address value of the node A 1601, the node A 1601 may drop the second reservation request packet.

Conversely, when the "previous address" field is the same as the address value of the node A 1601, the node A 1601 may transmit the second reservation request packet to the node B 1603 that has broadcasted the second reservation request packet in operation S1409.

In this instance, operation S1409 is performed in a predetermined slot of the second time duration where all the nodes included in the network is inactivated. The predetermined slot corresponds to a value stored in the "reservation slot number" field of the first reservation request packet.

Figure 15:
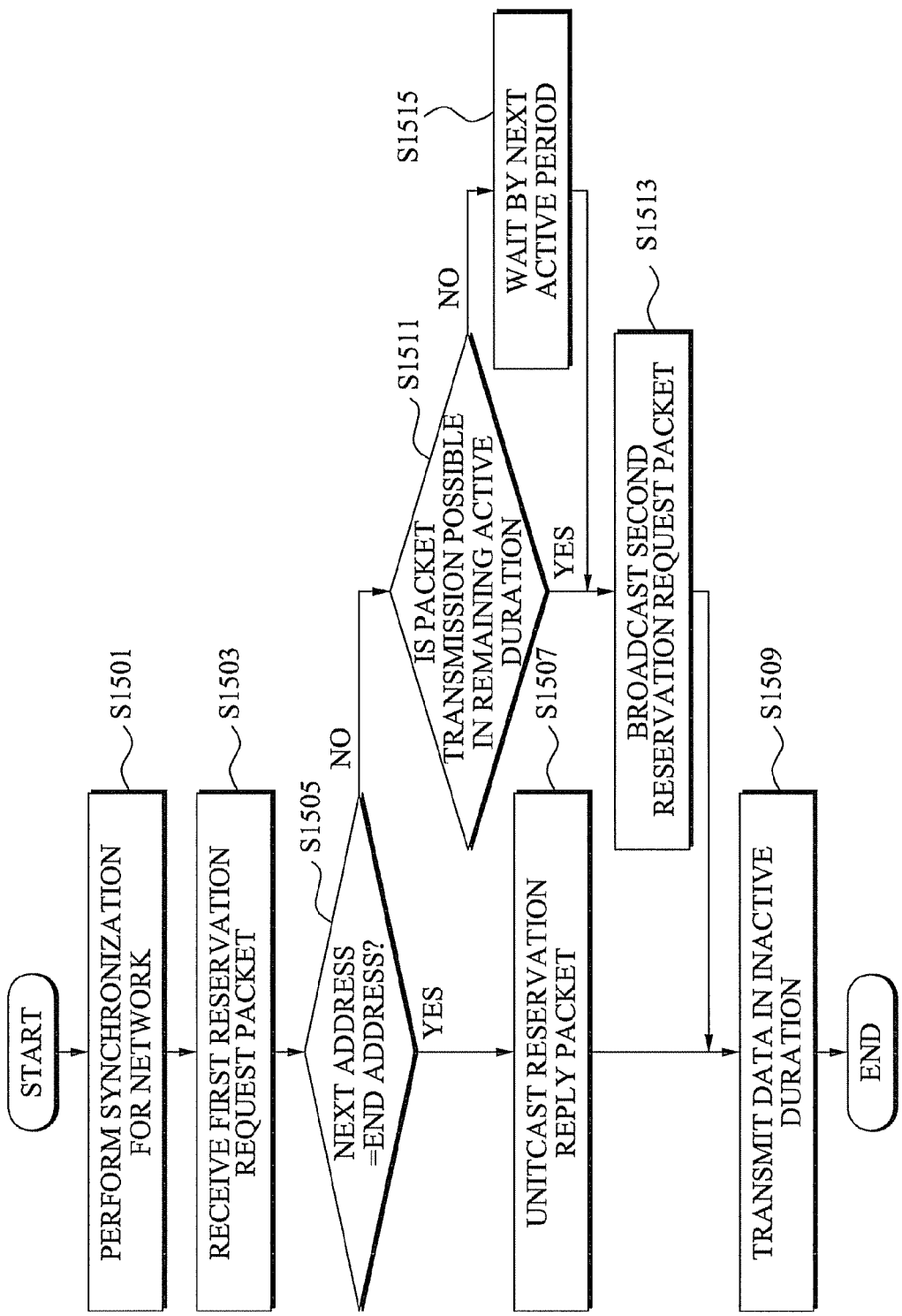
FIG. 15 is a flowchart illustrating a low power routing method using a reservation scheme in a wireless sensor network according to another embodiment of the present invention.

FIG. 15 is a flowchart illustrating a low power routing method using a reservation scheme in a wireless sensor network according to another embodiment of the present invention FIG. 15 shows operations that can be performed in the node B 1603, the node C 1605, and the node D 1607. Specifically, FIG. 15 illustrates operations performed in a relay node or an end node.

Referring to FIG. 15, the low power routing method using the reservation scheme may include: performing time synchronization for a network in operation S1501; receiving a first reservation request packet for data transfer reservation in a first time duration where all the nodes in the network are activated in operation S1503; transmitting any one of a second reservation request packet and a reservation reply packet by referring to the first reservation request packet in operations S1507 and 1513; and receiving data from a node transmitting the second reservation requests packet in a second tie slot where all the nodes in the network re inactivated in operation S1509.

In operation S1501, the relay node or the end node may perform time synchronization of the network for each synchronization region. In this instance, the time synchronization scheme may adopt all the synchronization schemes.

In operation S1503, the relay node or the end node may receive the first reservation request packet from a data transmission node. The first reservation request packet is in the frame format of FIG. 12.

When a node having received the first reservation request packet is the node B 1603, the data transmission node is the node A 1601.

Thus, a "previous field" value of the first reservation request packet includes an address value of the node A 1601. Also, a "reservation slot number" field of the first reservation request packet includes slot information for transmitting data in the second time duration.

Also, a "next address" field of the first reservation request packet includes an address value of a node corresponding to a next routing route, and a final address" field includes an address value of an end node.

The relay node or the end node may be activated in a slot corresponding to the "reservation slot number" field to thereby transmit and receive data.

When the relay node or the end node receives the first reservation request packet, the relay node or the end node may determine whether the "next address" field value is the same as the "end address" field value of the first reservation request packet in operation S1505.

In this instance, when the "next address" field value is the same as the "end address" field value, it means that the node having received the first reservation request packet is the end node. Thus, the end node may unicast a reservation reply packet in the frame format of FIG. 13 to the node that has transmitted the first reservation request packet in operation S1507.

Conversely, when the "next address" field value is different from the "end address" field value, it signifies that the node having received the first reservation request packet is not the end node. Thus, the node having received the first reservation request packet may broadcast the second reservation request packet in operation S1513.

Prior to broadcasting the second reservation request packet, the node having received the first reservation request packet may determine whether a packet transmission is possible in the remaining active duration in operation S1511. When the packet transmission is impossible in the remaining active duration, the node having received the first reservation request packets may wait until the next active duration of WI in operation S1515 and then broadcast the second reservation request packet in the active duration of WI.

In operation S1509, the relay node or the end node may transmit and receive data with the node that has transmitted the first reservation request packet. In this instance, operation S1509 is performed in a predetermined slot of the second time duration where all the nodes included in the network are inactivated. The predetermined slot corresponds to a value stored in the "reservation slot number" field of the first reservation request packet.

Figure 16:
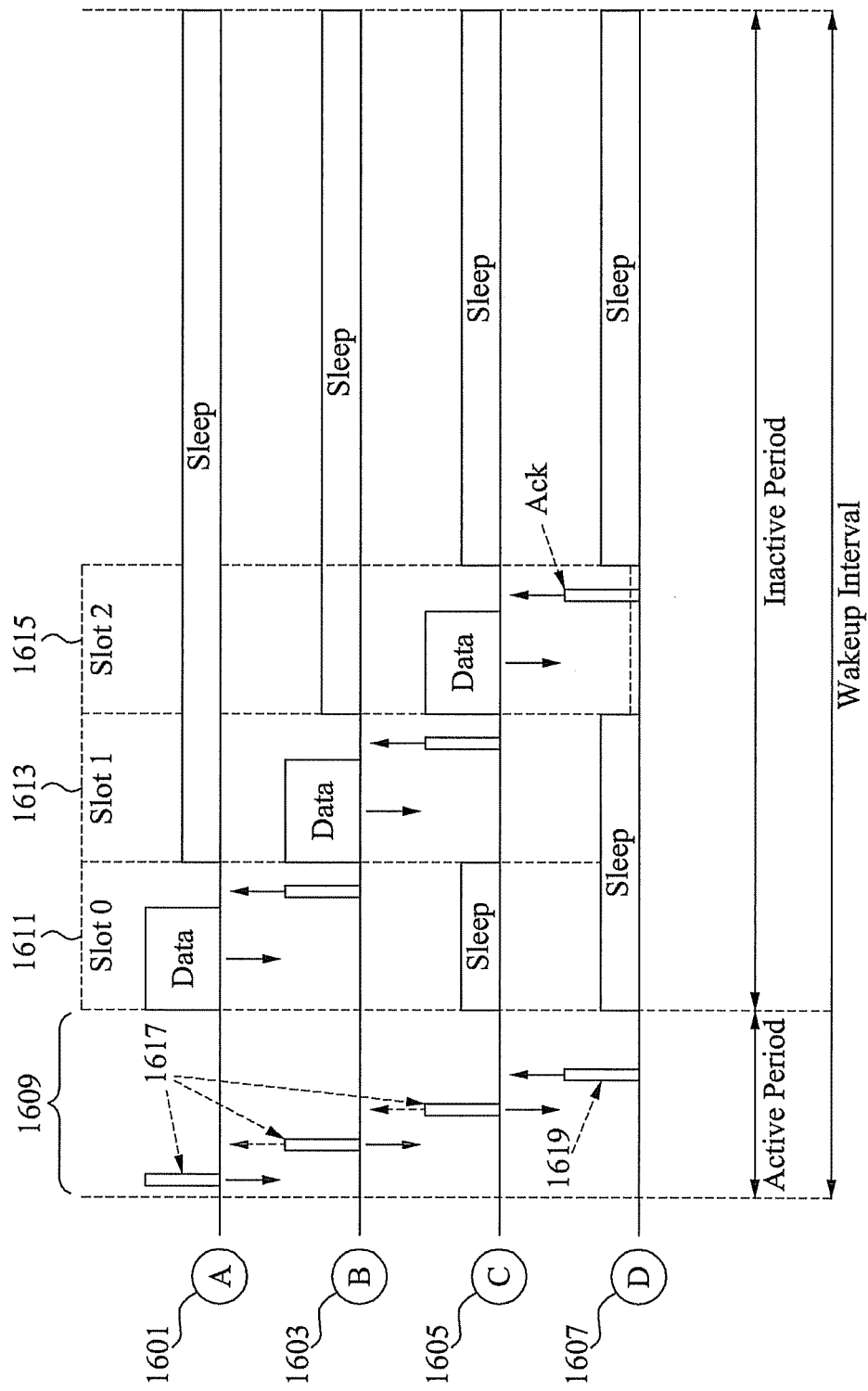
FIG. 16 illustrates an example of a time structure of a lower power routing method using a reservation scheme in a wireless sensor network according to an embodiment of the present invention.
Figure 17:
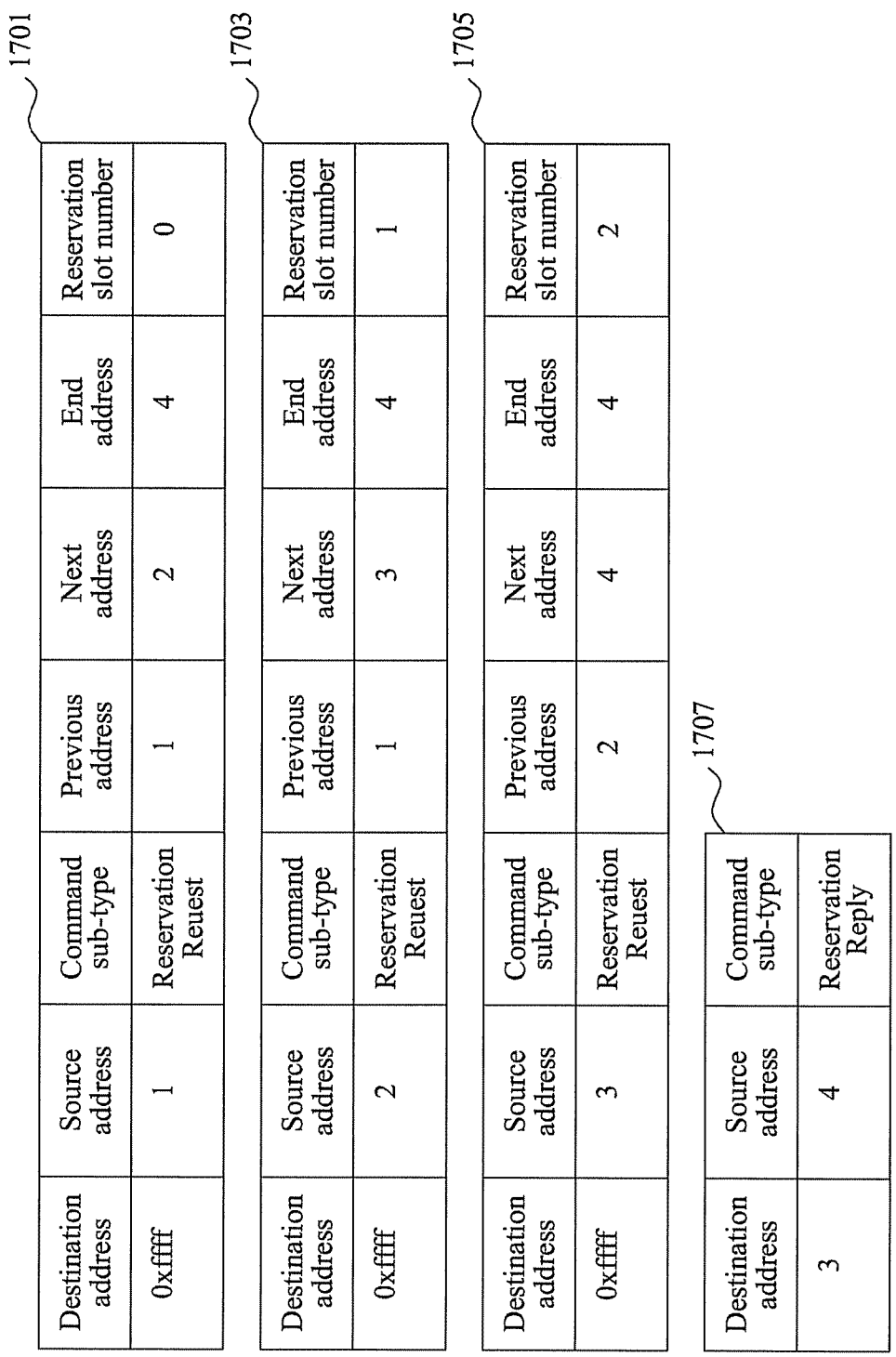
FIG. 17 illustrates an example of a reservation request packet and a reservation reply packet according to an embodiment of the present invention.

FIG. 16 illustrates an example of a time structure of a lower power routing method using a reservation scheme in a wireless sensor network according to an embodiment of the present invention, and FIG. 17 illustrates an example of a reservation request packet and a reservation reply packet according to an embodiment of the present invention.

Referring to FIG. 16, the wireless sensor network includes the node A 1601, the node B 1603, the node C 1605, and the node D 1607.

The node A 1601, the node B 1603, the node C 1605, and the node D 1607 are activated during an active period 1609 to transmit and receive a reservation request packet or a reservation reply packet.

In this instance, it is assumed that a data routing route is set in an order of the node A 1601, the node B 1603, the node C 1605, and the node D 1607 according to a predetermined routing algorithm.

Therefore, the node A 1601, the node B 1603, and the node C 1605 broadcast a reservation request packet 1617 in the active period 1609. The final destination node D 1607 transmits a reservation reply packet 1619 to the node C 1605 in the active period 1609.

Referring to FIG. 16, the node A 1601 may transmit data to the node 1603 in a slot (0) 1611 of the inactive period, the node B 1603 may transmit data to the node C 1605 in a slot (1) 1613 of the inactive period, and the node C 1605 may transmit data to the node D 1607 in a slot (2) 1615 of the inactive period.

Referring to FIGS. 16 and 17, it is possible to know a frame format 1701 of a reservation request packet of A that is broadcasted in the node A 1601. A "destination address" field of the reservation request packet of A includes "0xffff" corresponding to a broadcast value. A "previous address" field includes "1" corresponding to an address value of the node A 1601. A "reservation slot number" field includes "0" corresponding to the slot 0.

In a frame format 1703 of reservation request packet of B that is broadcasted in the node B 1603, a "previous address" field includes "1", a "next address" field includes "3" corresponding to an address value of the node C 1605, and a "reservation slot number" field includes "1" corresponding to the slot 1.

In a frame format 1705 of a reservation request packet of C that is broadcasted in the node C 1605, a "previous address" field includes "2" corresponding to an address value of the node B 1603, a "next address" field includes "4" corresponding to an address value of the node D 1607, and a "reservation slot number" field includes "1" corresponding to the slot 2.

As described above, the node D 1607 is the end node and thus in a frame format 1707 of the reservation reply packet, a "destination address" includes "3" corresponding to the address value of the node C 1605.

The time synchronization method and the low power routing method using the reservation scheme may include computer-readable media including program instructions to implement various operations embodied by a computer. The media may also include, alone or in combination with the program instructions, data files, data structures, tables, and the like.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A time synchronization method in a wireless sensor network, the method comprising:
    receiving a first synchronization request command packet from a parent node that manages time synchronization for a predetermined synchronization region;
    receiving, from the parent node, a second synchronization request command packet that has a transmission timestamp value of the first synchronization request command packet; and
    performing time synchronization for a child node based on a reception time of the first synchronization request command packet, a reception time of the second synchronization request command packet, and the transmission timestamp value of the first synchronization request command packet,
    wherein the performing of the time synchronization comprises obtaining a difference value between the reception time of the first synchronization request command packet and the reception time of the second synchronization request command packet and adding the difference value to the transmission timestamp value of the first synchronization request command packet to thereby match time information of the child node with time information of the parent node.

2. The method of claim 1, wherein the first synchronization request command packet comprises at least one of a sync interval that denotes a synchronization cycle and a sync boundary that denotes start and end time information of the synchronization cycle.

3. The method of claim 2, wherein when the first synchronization request command packet or the second synchronization request command packet is not received in a synchronization time duration corresponding to the sync interval, the child node receives a third synchronization request command packet and a fourth synchronization request command packet from another node excluding the parent node and transmits a synchronization reply packet to the node that transmits the third synchronization request command packet and the fourth synchronization request command packet.

4. A low power routing method using a reserved scheme in a wireless sensor network, the method comprising:
performing time synchronization for the network;
broadcasting a first reservation request packet for data transfer reservation in a first time duration where all the nodes in the network are activated;
receiving a second reservation request packet corresponding to the first reservation request packet; and
transmitting data to a node having transmitted the second reservation request packet in a second time slot where all the nodes in the network are inactivated,
wherein the performing of the time synchronization comprises transmitting a first synchronization request command to a child node of a predetermined synchronization region and a second synchronization request command that has a transmission timestamp value of the first synchronization request command,
wherein the child node obtains a difference value between a reception time of the first synchronization request command and a reception time of the second synchronization request command and adds the difference value to the transmission timestamp value of the first synchronization request command to thereby match time information of the child node with time information of a parent node.

5. The method of claim 4, wherein the performing of the time synchronization further comprises
receiving a synchronization reply packet corresponding to the first synchronization request command and the second synchronization request command from the child node of the synchronization region.

6. The method of claim 4, wherein the first reservation request packet comprises a previous node address, a next node address, an end node address, and reserved slot information for transmitting the data in the second time duration, and the previous node address is an address of a node that has transmitted the first reservation request packet.

7. The method of claim 4, wherein the second reservation request packet comprises a previous node address, a next node address, an end node address, and reserved slot information for transmitting the data in the second time duration, and the previous node address is an address of a node that has transmitted the first reservation request packet.

8. A low power routing method using a reservation scheme in a wireless sensor network, the method comprising:
performing time synchronization for the network;
receiving a first reservation request packet for data transfer reservation in a first time duration where all the nodes in the network are activated;
transmitting any one of a second reservation request packet and a reservation reply packet by referring to the first reservation request packet; and
receiving data from a node having transmitted the first reservation request packet in a second time slot where all the nodes in the network are inactivated,
wherein the performing of the time synchronization comprises:
receiving a first synchronization request command packet from a parent node that manages time synchronization for a predetermined synchronization region;
receiving, from the parent node, a second synchronization request command packet that has a transmission timestamp value of the first synchronization request command packet; and
obtaining a difference value between a reception time of the first synchronization request command packet and a reception time of the second synchronization request command packet and adding the difference value to the transmission timestamp value of the first synchronization request command packet to thereby match time information of a child node with time information of the parent node.

9. The method of claim 8, wherein the first reservation request packet comprises a previous node address, a next node address, an end node address, and reserved slot information for transmitting the data in the second time duration, and the previous node address is an address of a node that has transmitted the first reservation request packet.

10. The method of claim 9, wherein when the end node address is an address of a node that has received the first reservation request packet, the reservation reply packet is broadcasted by referring to the first reservation request packet.

11. An apparatus for performing time synchronization and low power routing in a wireless sensor network, the apparatus comprising:
a synchronization packet generator to generate a first synchronization request command packet for informing about time synchronization information of the synchronization region, a second synchronization request command packet that has transmission time information of the first synchronization request command packet
a synchronization performing unit to perform time synchronization of the network based on a reception time of the first synchronization request command packet and a reception time of the second synchronization request command packet; and
a reservation packet generator to generate a reservation packet for reservation transfer of data in the network where the time synchronization is performed,
wherein the synchronization performing unit obtains a difference value between the reception time of the first synchronization request command packet and the reception time of the second synchronization request command packet and adding the difference value to the transmission timestamp value of the first synchronization request command packet.

12. The apparatus of claim 11,
wherein the synchronization packet generator further generates a synchronization reply packet corresponding to the second synchronization request command packet, and a synchronization reply packet for error synchronization restoration.

13. The apparatus of claim 11, wherein the reservation packet is any one of a reservation request packet for informing about a reservation transfer time of the data and a reservation reply packet corresponding to the reservation request packet.

14. The apparatus of claim 11, further comprising:
a transceiver to broadcast the reservation packet in a first time duration where all the nodes in the network are activated.

15. The apparatus of claim 11, wherein the transceiver transmits the data in a predetermined slot of a second time duration where all the nodes in the network are inactivated.

* * * * *